United States Patent
Spencer (10) Patent No.: US 9,528,630 B2
(45) Date of Patent: Dec. 27, 2016

(54) APPARATUS FOR SETTING AND VERIFYING SET POINT ON A VALVE ASSEMBLY

(71) Applicant: Dresser, Inc., Addison, TX (US)

(72) Inventor: Mychal Phillip Spencer, Pineville, LA (US)

(73) Assignee: Dresser, Inc., Addison, TX (US)

( * ) Notice: Subject to any disclaimer, the term of this patent is extended or adjusted under 35 U.S.C. 154(b) by 575 days.

(21) Appl. No.: 14/055,458

(22) Filed: Oct. 16, 2013

(65) Prior Publication Data

US 2015/0102252 A1    Apr. 16, 2015

(51) Int. Cl.
| | | |
|---|---|---|
| F16K 17/00 | (2006.01) | |
| F16K 37/00 | (2006.01) | |
| F16K 15/02 | (2006.01) | |
| G01L 1/00 | (2006.01) | |
| F16K 17/06 | (2006.01) | |

(52) U.S. Cl.
CPC ......... *F16K 37/0083* (2013.01); *F16K 15/026* (2013.01); *F16K 17/06* (2013.01); *F16K 37/0075* (2013.01); *G01L 1/00* (2013.01)

(58) Field of Classification Search
CPC ........ F16K 17/06; F16K 37/0083; G01L 1/00; G01L 1/04
USPC ..... 137/315.04, 524, 530; 73/1.72; 267/175, 267/177
See application file for complete search history.

(56) References Cited

U.S. PATENT DOCUMENTS

| | | | |
|---|---|---|---|
| 1,822,587 A | | 9/1931 | Essen |
| 2,080,760 A | * | 5/1937 | Condon ............... F16K 17/06 |
| | | | 137/524 |
| 2,419,293 A | | 4/1947 | Simonson |
| 2,589,552 A | | 3/1952 | Kerr |
| 2,616,292 A | | 11/1952 | Malm |
| 3,019,811 A | * | 2/1962 | Schrimshaw .......... B60G 15/12 |
| | | | 137/478 |
| 3,269,170 A | | 8/1966 | Sebring et al. |
| 4,086,809 A | | 5/1978 | Wu et al. |
| 4,428,223 A | | 1/1984 | Trevisan |
| 4,557,136 A | | 12/1985 | Greenhalf |
| 4,641,521 A | | 2/1987 | Lawrence |
| 4,761,999 A | * | 8/1988 | Thompson .......... F16K 37/0083 |
| | | | 73/1.68 |
| 5,275,036 A | | 1/1994 | Schulz et al. |
| 6,098,446 A | | 8/2000 | Buxton |

OTHER PUBLICATIONS

International Search Report and Written Opinion issued in connection with corresponding PCT Application No. PCT/US2014/055833 on Nov. 25, 2014.

* cited by examiner

*Primary Examiner* — Mary McManmon
*Assistant Examiner* — Reinaldo Sanchez-Medina
(74) *Attorney, Agent, or Firm* — Paul Frank + Collins P.C.

(57) ABSTRACT

Embodiments of an apparatus that provide functions to set and to verify the set point of a valve assembly in a single device. These embodiments forgo the need to use of two separate devices, one each to accomplish the tasks to set the set point and to verify the set point. Rather, the apparatus incorporates components that can assume different configurations including a first configuration that facilitates the task for setting the set point and a second configuration that facilitates the task of verifying the set point.

10 Claims, 12 Drawing Sheets

APPARATUS FOR SETTING AND VERIFYING SET POINT ON A VALVE ASSEMBLY

BACKGROUND

The subject matter disclosed herein relates to valves and valve technology with particular discussion about an apparatus that can aid in both setting and verifying a set point on a valve assembly.

Valve assemblies integrate several components that cooperate together to regulate flow of a working fluid. Pressure relief valves and other safety valves, for example, use a spring (and/or like resilient member) in a compressed state to maintain the valve assembly in a closed position. This spring exerts a spring force to locate a disc element in contact with a nozzle element to prevent flow of the working fluid through the device. In operation, the spring force correlates with a operating pressure for the working fluid that acts against the disc element. This operating pressure is also called the set point. When the pressure of the working fluid reaches (and/or surpasses) the set point, the disc element may move relative to the nozzle element to an open position that allows the working fluid to flow through the device.

Values for the set point often depend on factors specific to the application that incorporates the valve assembly. It is not uncommon for installation of the valve assembly, e.g., into a process line and/or on a pressurized vessel, to include steps to set the compressed state of the spring to match the set point for the application. Management of the application, as well as regulations and/or public policy, may also require periodic evaluation to assess, in situ, the operation of the valve assembly. For devices including pressure relief valves and safety valves, this assessment finds particular benefit because under ordinary operating conditions, these types of valves typically remain in the closed position and rarely, if ever, move from the closed position to the open position. The lack of movement may cause the set point to migrate away from the original settings (e.g., the compressed state of the spring) that the valve assembly had during installation. The evaluation procedures can ensure that the value for the set point of the valve assembly remains at a certain value or within a certain range.

Conventional devices are known that address the set point on valve assemblies. These devices can apply a load to the spring member, for example, in a direction that corresponds to movement of the disc element relative to the nozzle element to change the valve assembly from the closed condition to the open condition. Unfortunately, these conventional devices are generally only useful to either set or test the set point, but not both. For pressure relief valves that utilize large springs and/or springs that generate high spring forces, this shortcoming in the conventional devices requires use, storage, and maintenance of several different large, unwieldy devices on site to accomplish the tasks necessary to set and to verify the set point for these types of valve assemblies.

BRIEF SUMMARY OF THE INVENTION

This disclosure describes embodiments of an apparatus that provide the functions to set and to verify the set point of a valve assembly in a single device. These embodiments forgo the need to use of two separate devices, one each to accomplish the tasks to set the set point and to verify the set point. Rather, the apparatus incorporates components that can assume different configurations including a first configuration that facilitates the task for setting the set point and a second configuration that facilitates the task of verifying the set point.

BRIEF DESCRIPTION OF THE DRAWINGS

Reference is now made briefly to the accompanying figures, in which.

Where applicable like reference characters designate identical or corresponding components and units throughout the several views, which are not to scale unless otherwise indicated.

DETAILED DISCUSSION

The discussion below describes embodiments of an apparatus for use to set and to verify operating settings on a valve assembly. These operating settings include, for example, the set point for pressure relief valves (also "safety valves") that relieve pressure build-up that might occur in a process line and/or pressurized vessel. As discussed more below, the embodiments simplify the process that technicians perform to ensure proper operation of the valve assembly because the embodiments combine multiple functions (i.e., to set the set point and to verify the set point) into a single device. In conventional techniques, on the other hand, technicians utilize different devices to complete the requisite setting and/or verification procedure on the valve assembly. For example, these devices become particularly cumbersome for valve assemblies that require forces in excess of 20,000 lbf or more to compress springs to set and to verify the appropriate set point. The embodiments of this disclosure simplify these tasks, while also eliminating the need to maintain and store separate devices for addressing the set point on the valve assembly.

Figure 1:
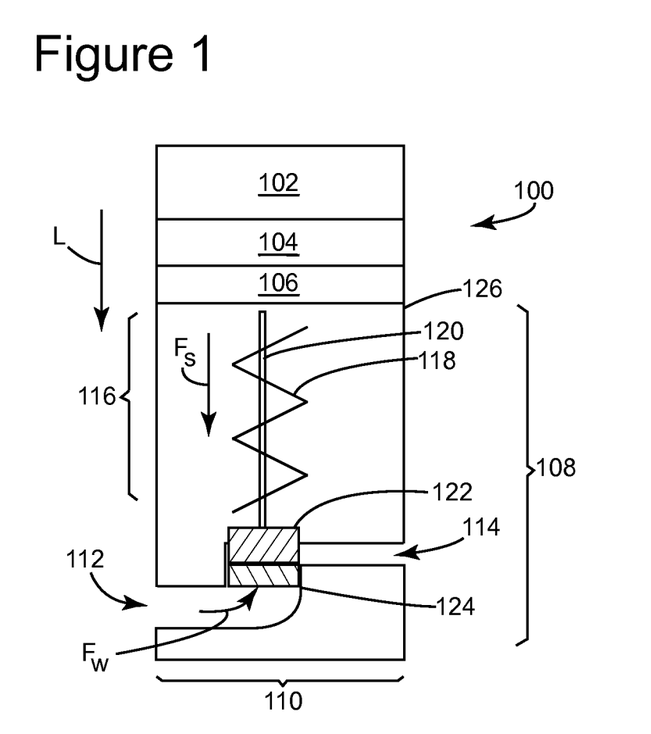
FIG. 1 depicts a schematic diagram of an exemplary embodiment of an apparatus to set and to verify set point on a valve assembly.

FIG. 1 depicts a schematic diagram of an exemplary embodiment of an apparatus 100 that incorporates components to both set and to verify the set point of a valve assembly. These components include a mounting component 102, a force generating component 104 that generates a load L, and a force coupling component 106. FIG. 1 also shows the apparatus 100 in position on a valve assembly 108. Examples of the valve assembly 108 can include pressure relief valves that regulate the flow of a working fluid $F_W$. The valve assembly 108 has a flow path 110 with one or more inlet/outlets (e.g., a first inlet/outlet 112 and a second inlet/outlet 114). The valve assembly 108 also has a number of valve components that regulate the flow of the working fluid $F_W$ between the inlet/outlets 112, 114. The valve components can include a spring assembly 116 with a spring member 118, a spindle member 120, a disc member 122, a nozzle member 124, and a bonnet member 126.

In conventional designs, the valve components operate to regulate the flow of the working fluid $F_W$ between the inlet/outlets 112, 114. For example, the spring assembly 116 can generate a spring force $F_S$ that biases the disc member 122 in contact with the nozzle member 124. This feature "closes" the valve assembly 108 to prevent the flow of the working fluid $F_W$, e.g., from the first inlet/outlet 112 to the second inlet/outlet 114. A build-up of pressure of the working fluid $F_W$ against the disc member 122, however, can move (or "unseat") the disc member 122 from the nozzle member 124. The change in position of the disc member 122 relative to the nozzle member 124 "opens" the valve assembly 108 to allow the flow of the working fluid $F_W$, e.g., from the from the first inlet/outlet 112 to the second inlet/outlet 114. The set point of the valve assembly 108 corresponds to the pressure the working fluid $F_W$ must exert on the disc member 122 to move the disc member 122 relative to the nozzle member 124.

The apparatus 100 directs the load L to the valve components to modify and/or to verify the set point of the valve assembly 108. As noted above, this feature is unique with respect to conventional devices and/or techniques that can perform functions to either set the set point or to verify the set point, but not both. In one implementation, the apparatus 100 directs the load L in a manner that compresses the spring member 118 to achieve the set point that is desired for the valve assembly 108. In another implementation, the apparatus 100 can direct the load L in a manner that can induce movement in the disc member 122 to move the disc member 122 relative to the nozzle member 124. This feature can verify that the spring member 118 has the appropriate compression and, thus, that the valve assembly 108 will operate at the desired set point to "open" in response to appropriate pressure of the working fluid $F_W$.

As discussed more below, the force coupling component 106 can change among multiple configurations to adapt the apparatus 100 to appropriately direct the load L to the valve components. The force coupling component 106 can assume a first configuration that directs the load from the force generating component 104 to compress the spring member 118 in a first direction. This first configuration is useful to set the set point of the valve assembly 108. The force coupling component 106 can also assume a second configuration, which is different from the first configuration, that directs the load from the force generating component 104 in a manner to compress the spring member 118 in a second direction that is the opposite of the first direction. The second direction is useful to verify the set-point of the valve assembly 108.

Figure 2:
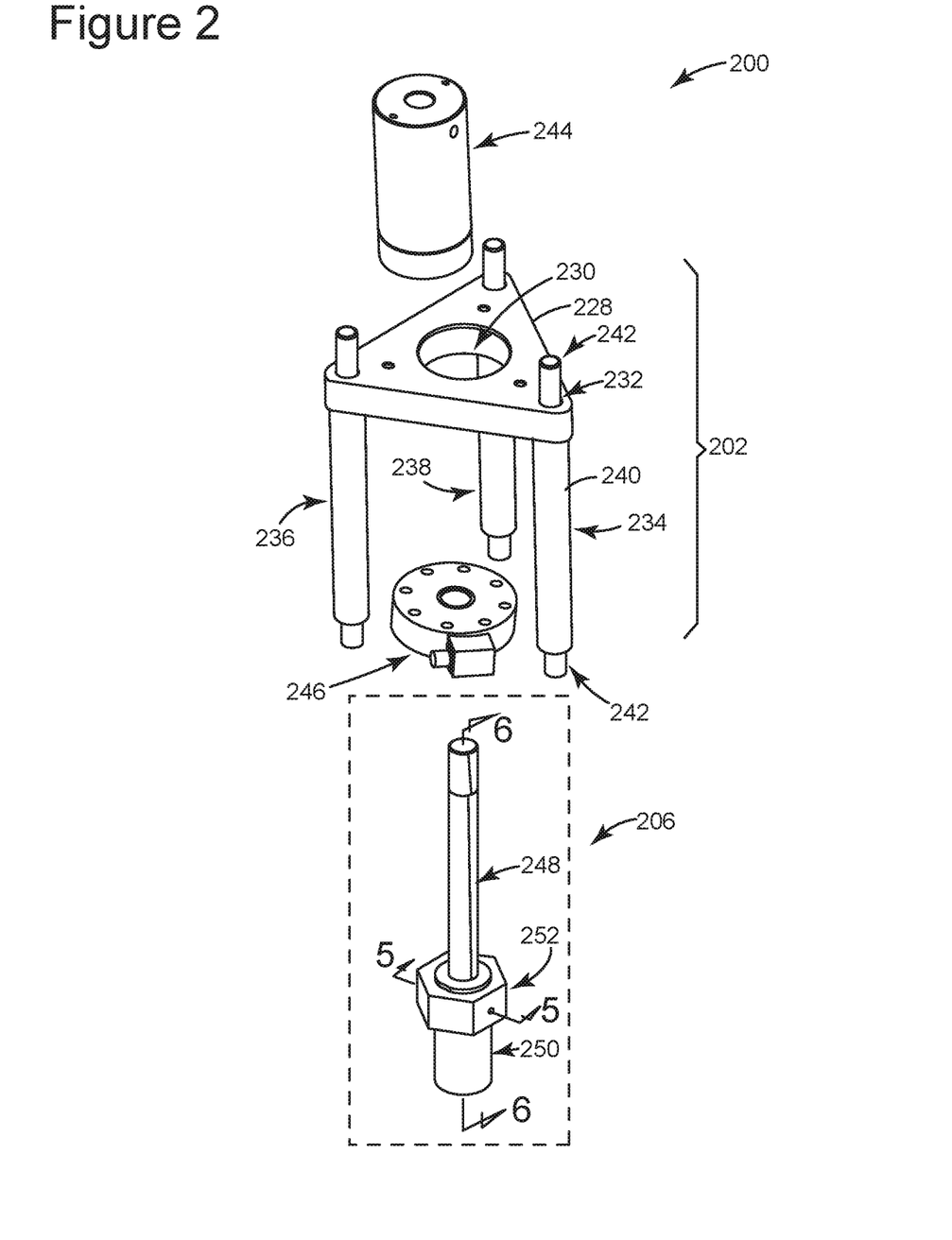
FIG. 2 depicts a perspective view of an exemplary embodiment of an apparatus for setting and verify set point on a valve assembly.

FIG. 2 illustrates a perspective view of an exemplary embodiment of an apparatus 200 in partial exploded form. The components of the apparatus 200 can be part of a kit, which when assembled will effectuate the functions of the apparatus 200. As noted herein, the embodiments of the apparatus 200 offers the dual functions to set and to verify the set point of a valve assembly, the combination of which is generally not found on conventional devices that separately perform these functions. In FIG. 2, the mounting component 202 has a mounting plate 228 with a central opening 230 and one or more peripheral openings 232. The mounting component 202 can also have one or more mounting legs (e.g., a first mounting leg 234, a second mounting leg 236, and a third mounting leg 238) forming an elongated body 240 with ends 242 that can incorporate threads to couple with a fastener (e.g., a nut) and/or correspondingly threaded opening or hole. The force generating component (e.g., force generating component 104 of FIG. 1) includes a lift member 244 and a load measuring member 246. The force coupling component 206 includes a spindle connection member 248, a plunger connection member 250, and a force directing member 252.

Figure 3:
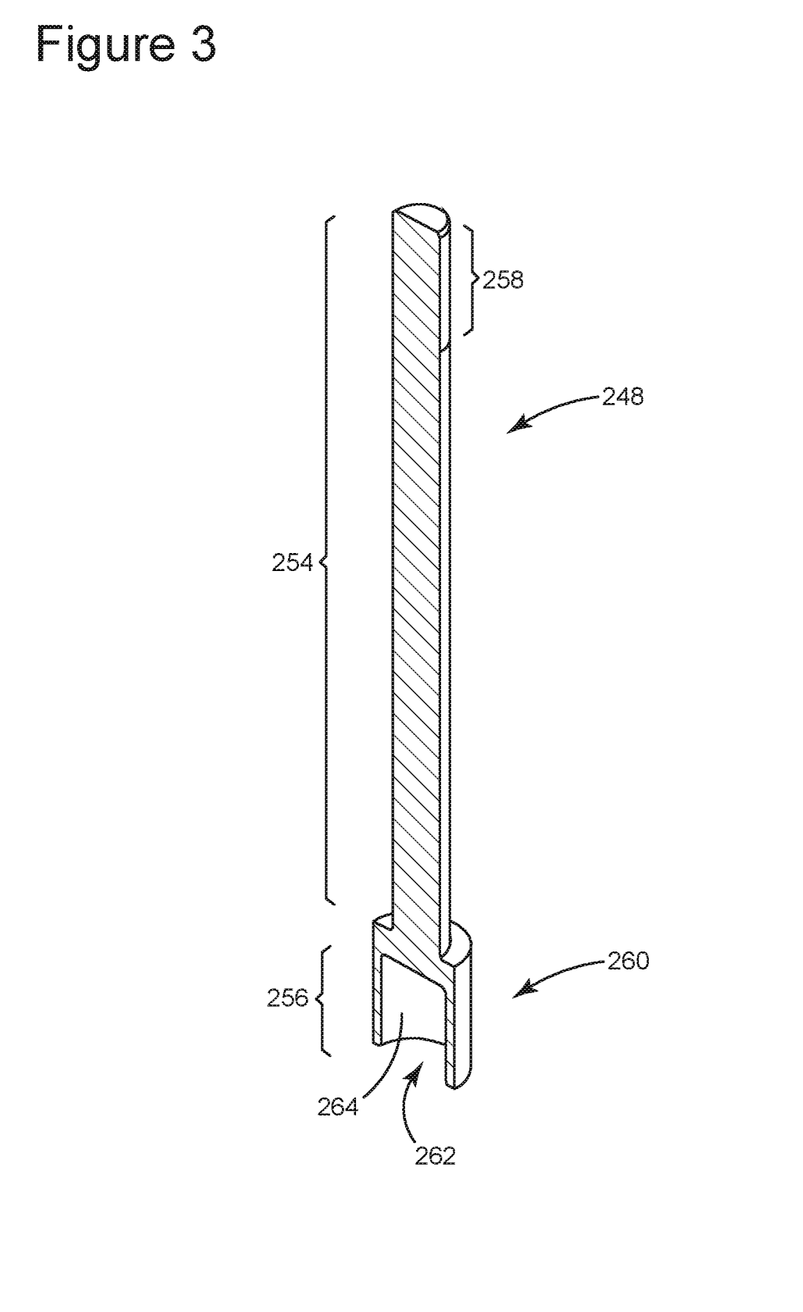
FIG. 3 depicts a perspective, cross-section view of an example of a spindle connection member for use in the apparatus of FIGS. 1 and 2.
Figure 4:
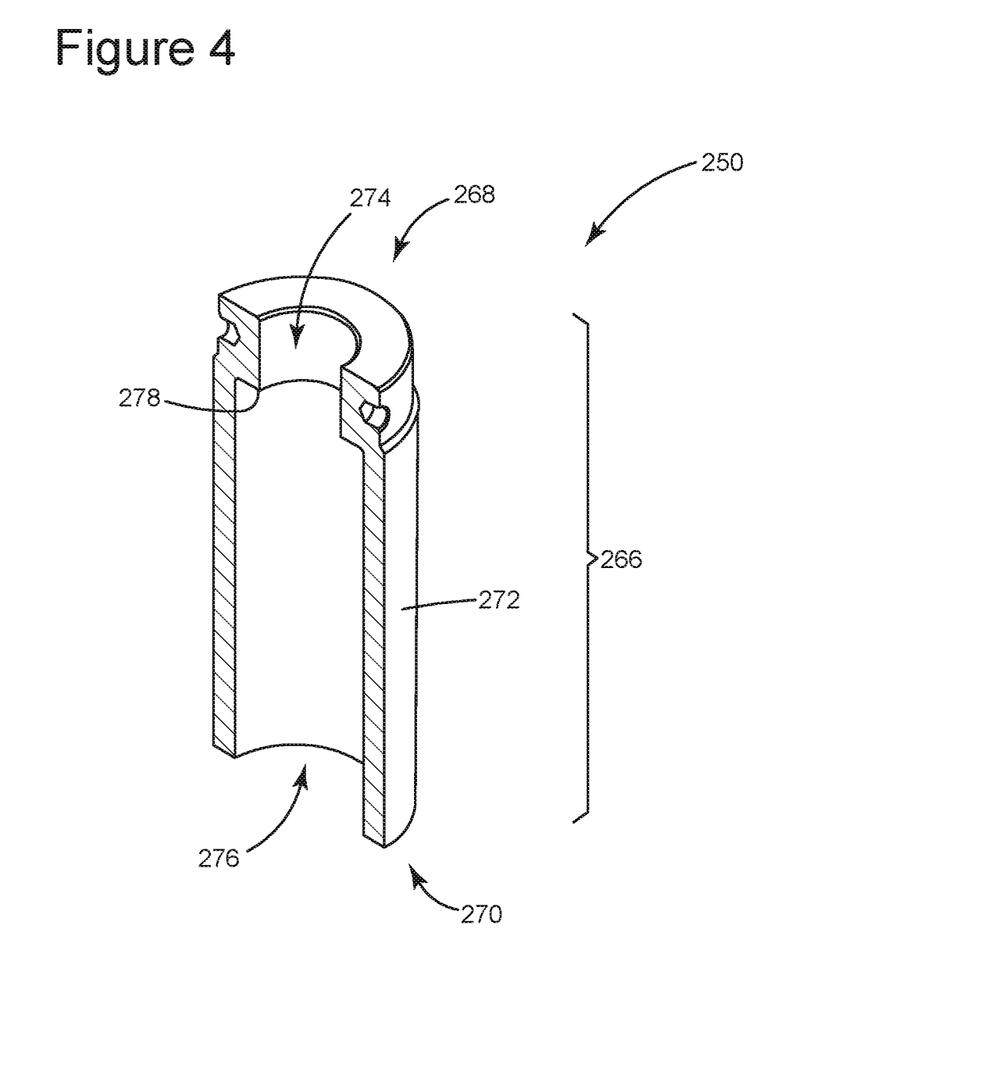
FIG. 4 depicts a perspective, cross-section view of an example of a plunger connection member for use in the apparatus of FIGS. 1 and 2.
Figure 5:
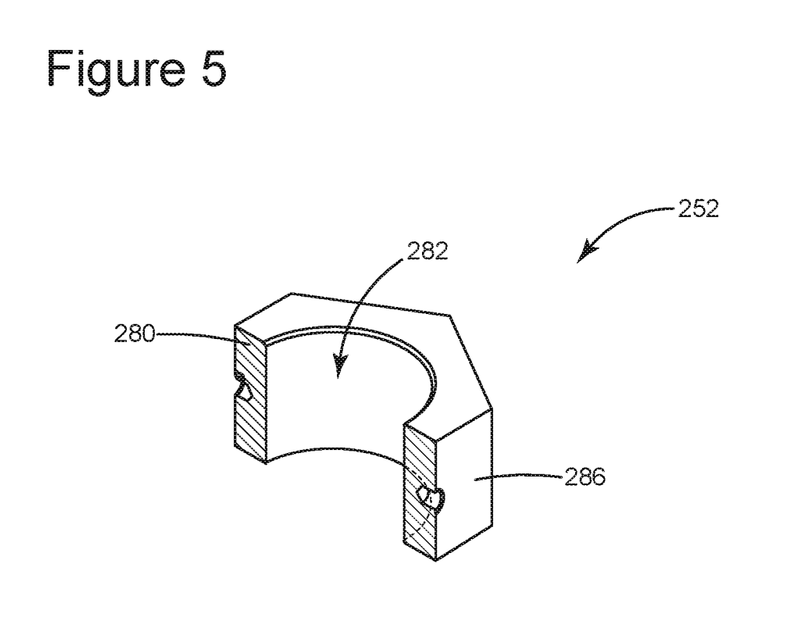
FIG. 5 depicts a perspective, cross-section view of an example of a force directing member for use in the apparatus of FIGS. 1 and 2.

FIGS. 3, 4, and 5 provide details of the construction of the components 248, 250, 252 of the force coupling component 206. FIG. 3 illustrates a cross-section of an example of the spindle connection member 248. FIGS. 4 and 5 depict a cross-section of an example of, respectively, the plunger connection member 250 and the force directing member 252.

Broadly, manufacture of the components 248, 250, 252 (and the apparatus 200 generally) can utilize materials and techniques that comport with the application and/or valve assembly the apparatus 200 will affix thereon. Material selection will often exhibit properties that can withstand the rigors of operation (e.g., high pressures and loads) and environment (e.g., caustic, corrosive, high temperature, etc.). Suitable metals (e.g., steel, stainless steel, etc.) and/or composites are some likely candidate materials for use in one or more of the components 248, 250, 252.

The spindle connection member 248 of FIG. 3 has a shaft 254 with a first end 256 and a second end 258. The first end 256 of the shaft 254 has an attachment element 260 with an attachment bore 262. In one example, the attachment bore 262 has an interior bore surface 264 that incorporates threads that match with corresponding threads on a spindle member (e.g., spindle member 118 of FIG. 1). At the second end 258, the shaft 254 terminates at a prepared section that can have features (e.g., threads) to couple with a fastener (e.g., a bolt).

In FIG. 4, the example of the plunger connection member 250 has a body 266 with a top 268, a bottom 270, and an outer peripheral surface 272. The body 266 also has a first bore 274 and a second bore 276 extending from the bottom 270. In one example, the diameter of the first bore 274 is smaller than the diameter of the second bore 276, thus creating a shelf 278 (also "mating surface 278") in the interior of the body 266. The outer peripheral surface 272 can incorporate threads and/or like surface features that prepare the surface to engage one or more other components, e.g., the force directing member 252.

The force directing member 252 of FIG. 5 has a body 280 with a central bore 282. The body 280 also has an outer profile that defines the features of an outer surface 286. These features can include one or more planar surfaces, an example of which is shown in FIG. 5. The planar surfaces can also facilitate manipulation of the force directing member 252. For example, and as discussed in more detail below, the planar surfaces can provide leverage for a tool (e.g., a wrench) to grab onto the force directing member 252 to change the position of the force directing member 252 relative to the plunger connection member 250.

Figure 6:
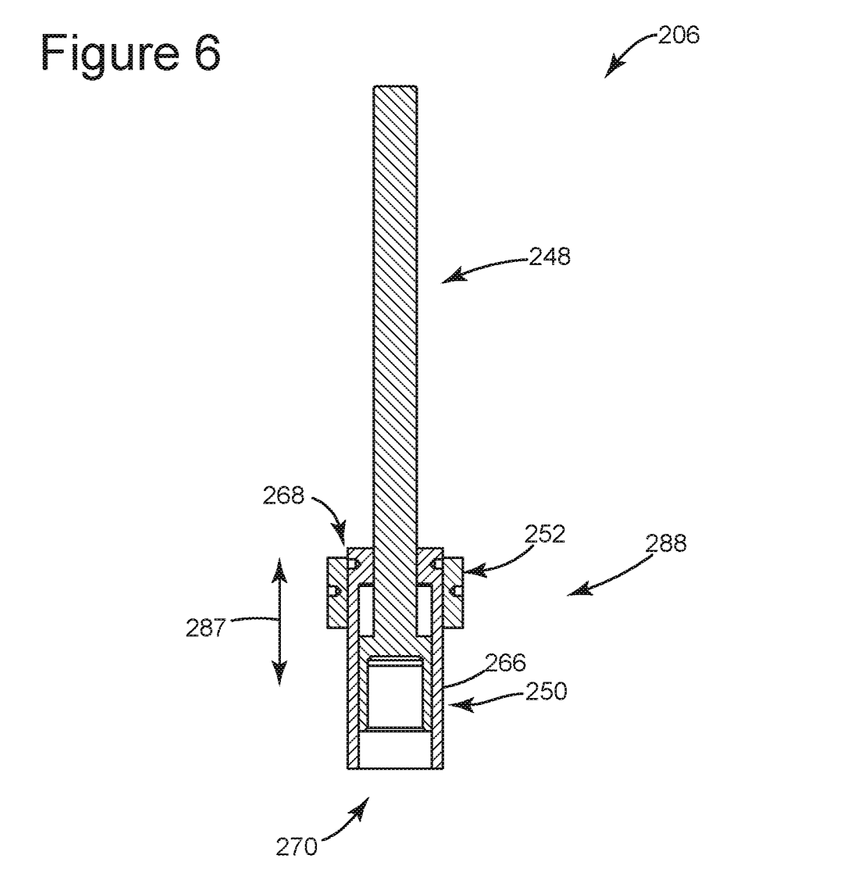
FIG. 6 depicts a perspective, cross-section view of a force coupling component that includes the spindle connection member, the plunger connection member, and the force directing member of FIGS. 3, 4, and 5, wherein the force directing member is in a first position relative to the plunger connection member.
Figure 7:
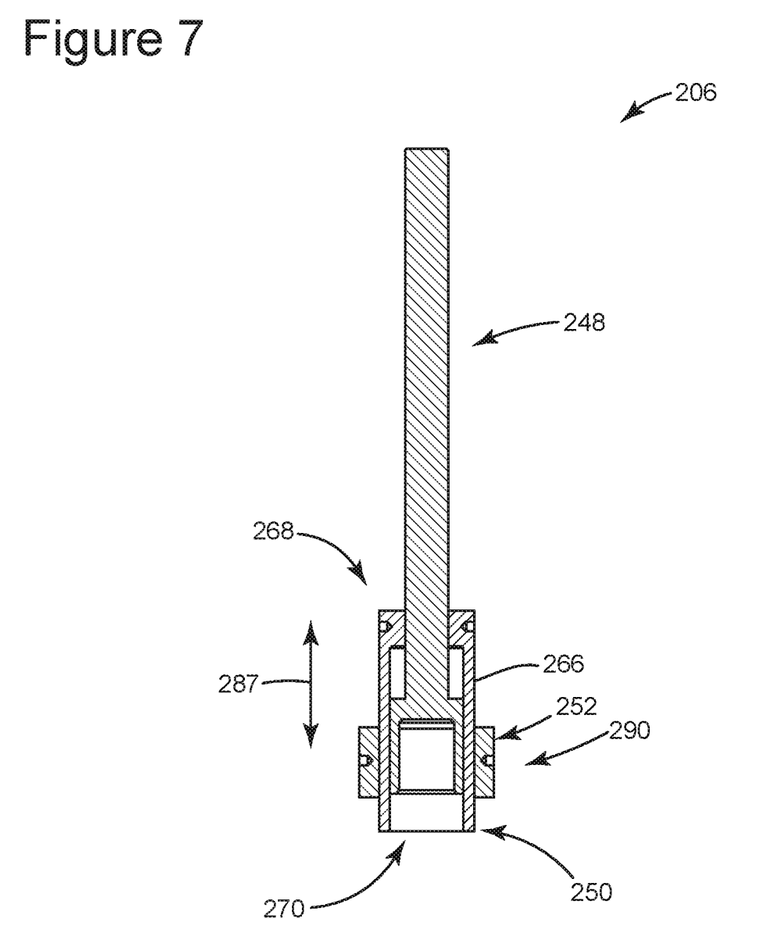
FIG. 7 depicts the force coupling component of FIG. 6, wherein the force directing member is in a second position relative to the plunger connection member.

FIGS. 6 and 7 illustrate cross-section views of the force coupling component 206 take at line 6-6 of FIG. 2. As noted above, and indicated in FIGS. 6 and 7 by the arrow enumerated 287 the force-directing member 252 can transit longitudinally relative to the plunger connection member 250. This movement changes the position of the force force-directing member 252 with respect to the top 268 and the bottom 270 of the body 266 of the plunger connection member 250. In FIG. 6, for example, the force-directing member 252 is shown in a first position 288, proximate the top 268. The example of FIG. 7 shows the force-directing member 252 in a second position 290, which is different from the first position and spaced apart from the top 268.

Figure 8:
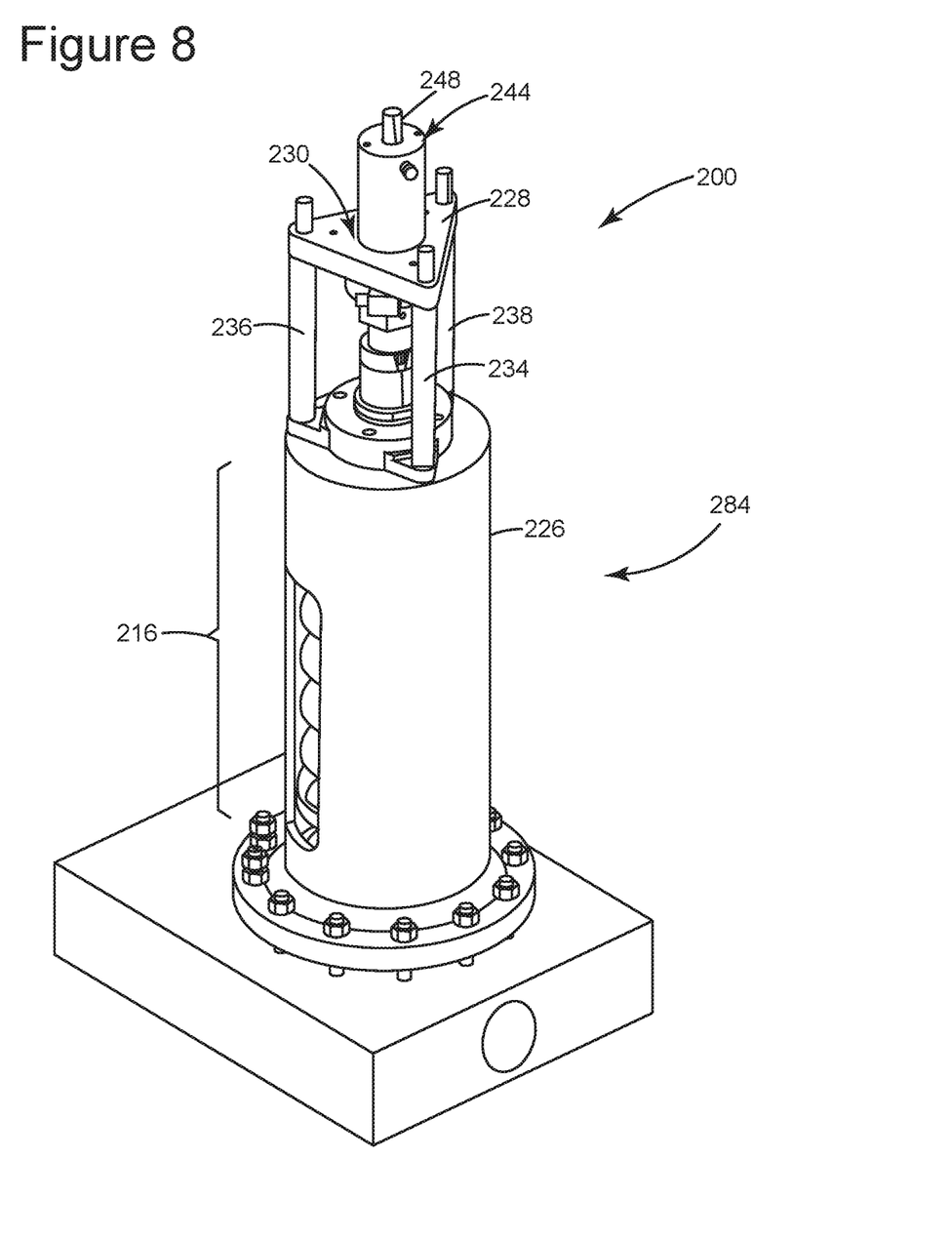
FIG. 8 depicts the apparatus of FIG. 2 in position on a pressure relief valve.

FIG. 8 illustrates one implementation of the apparatus 200 to set and to verify the set point on a valve assembly 208. As best shown in FIG. 8, the apparatus 200 can secure to a pressure relief valve 284. This implementation couples one end of the mounting legs 234, 236, 238 with corresponding openings (e.g., threaded openings) at the top of the bonnet member 226. This arrangement locates the apparatus 200 in position to interface with the spring assembly 216. In one implementation, the lift member 244 inserts into the opening 230 on the mounting plate 228. The spindle connection member 248 extends through the lift member 244, exposing one end outside of the lift member 244. The other end of the spindle connection member 248 can couple with the spindle member (not shown) on the spring assembly 216.

Figure 9:
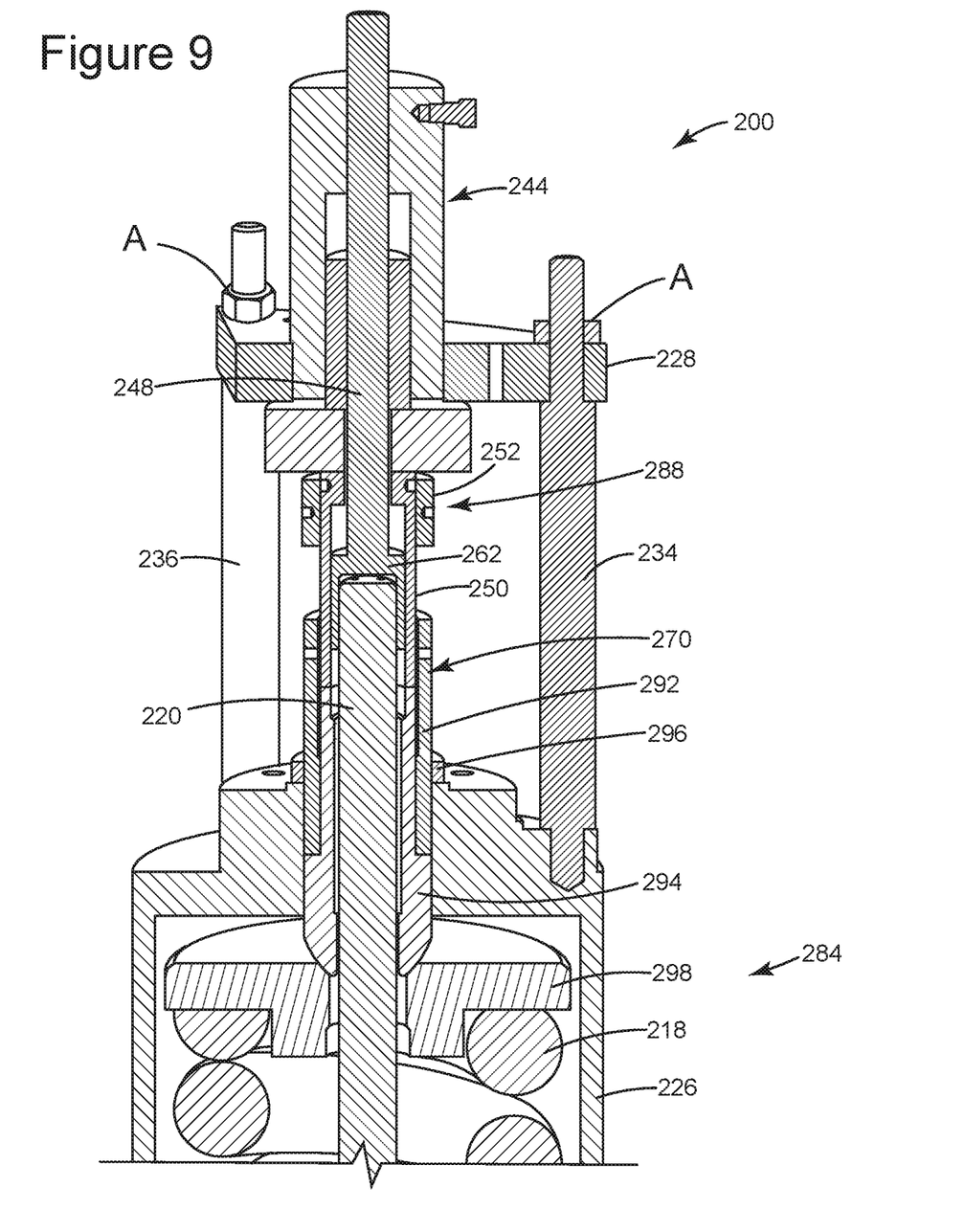
FIG. 9 depicts an elevation, cross-section view of the apparatus of FIG. 8, wherein the apparatus is in a first configuration to set the set point of the pressure relief valve.
Figure 10:
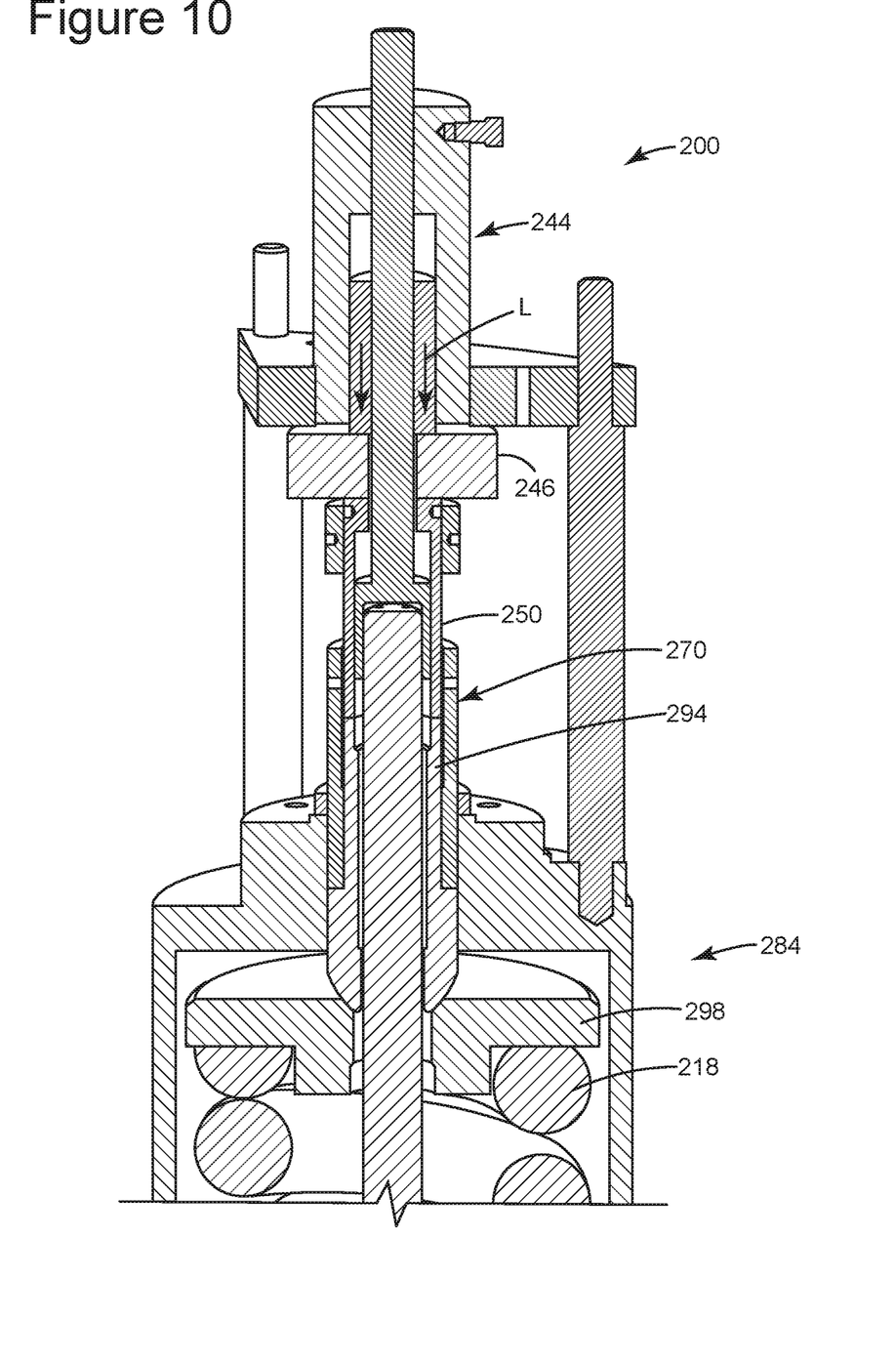
FIG. 10 depicts the loading pattern of the apparatus of FIG. 9.
Figure 11:
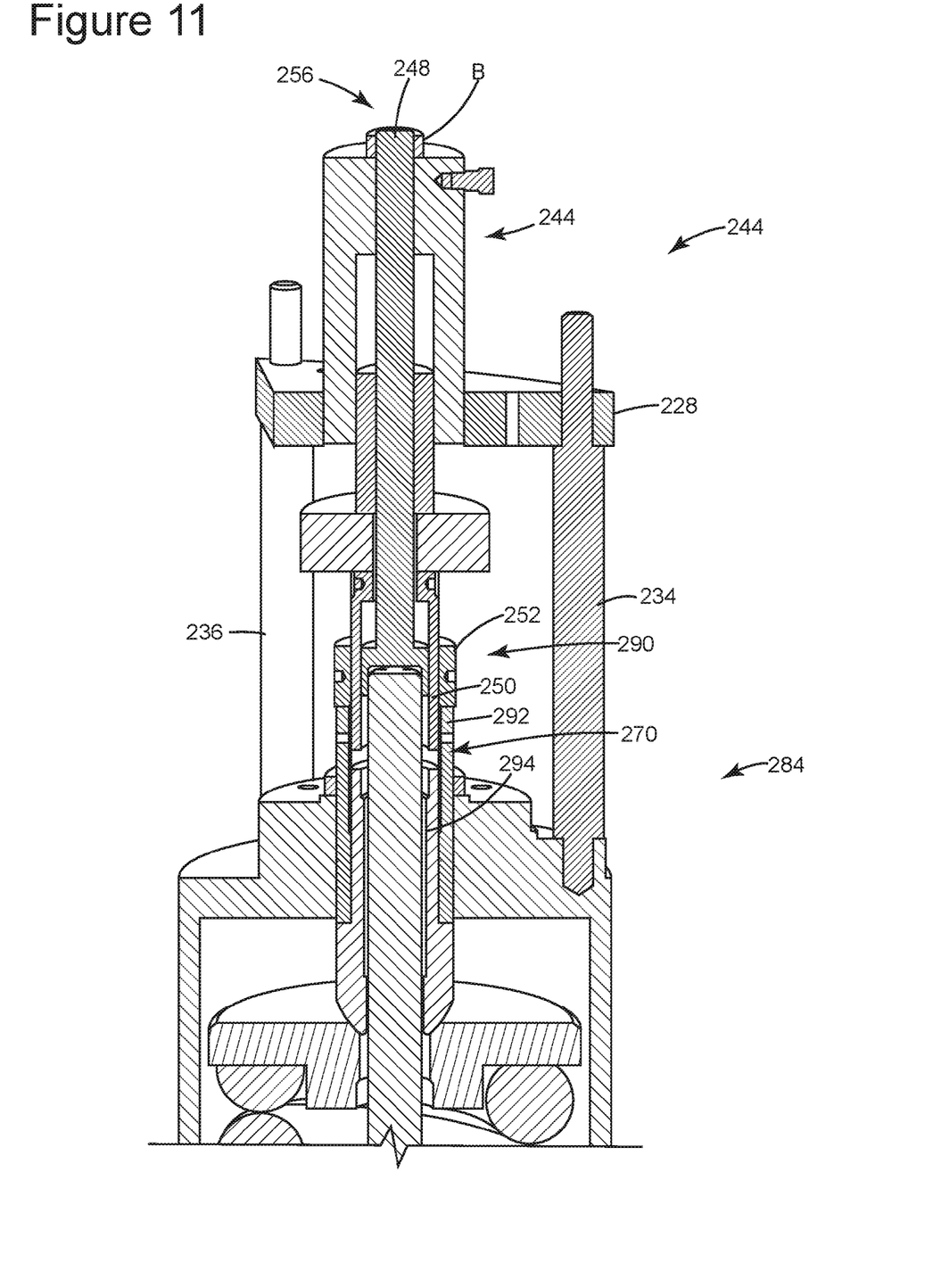
FIG. 11 depicts an elevation, cross-section view of the apparatus of FIG. 8, wherein the apparatus is in a second configuration to verify the set point of the pressure relief valve.
Figure 12:
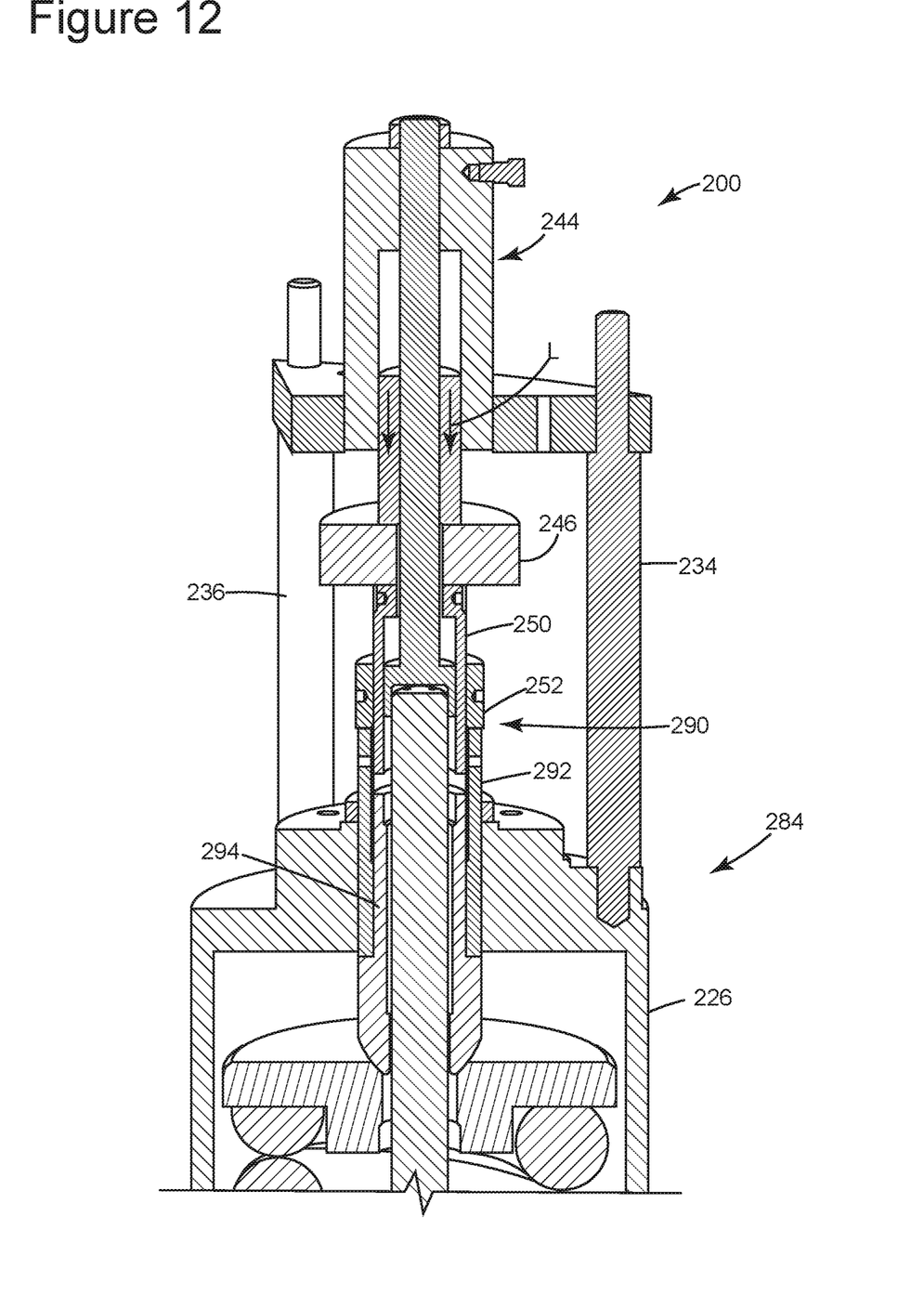
FIG. 12 depicts the loading pattern of the apparatus of FIG. 11.

FIGS. 9, 10, 11, and 12 illustrate a front, cross-section view of the pressure relief valve 284 taken at line 9-9 of FIG. 8. This view, and the discussion that follows, provide additional details on the construction and possible use of the apparatus 200 to set and verify set point on the pressure relief valve 284. FIGS. 9 and 10 show the apparatus 200 in a first configuration that is useful to set the set point of the pressure relief valve 284. FIGS. 11 and 12 show the apparatus 200 in a second configuration, which is different from the first configuration. The second configuration is useful to verify the set point of the pressure relief valve 284. As noted herein, conventional techniques would require more than one device to perform these two functions (i.e., to set and to verify the set point) on the pressure relief valve 284.

As shown in FIG. 9, the pressure relief valve 284 includes a compression screw 292, a plunger 294, a lock nut 296, and spring washer 298. In conventional operation, the plunger 294 presses down on the spring washer 298 to deform the spring member 218. The compression screw 292 threads into the bonnet member 226 to set the position of the plunger 294. The lock nut 296 engages threads on the outer surface of the compression screw 292 to lock the compression screw 292 in position. This feature fixes the deformation in the spring member 218 by preventing the compression screw 292 from backing out of position in the bonnet member 226.

The first configuration of the apparatus 200 sets the deformation of the spring member 218 to correspond with the set point of the pressure relief valve 284. In one implementation, fasteners A secure in position on leg members 234, 236 (and leg member 238, not shown) to fix the mounting plate 228 relative to the bonnet member 226. The attachment element 262 of the spindle connection member 248 secures to the top of the spindle member 220. As shown in FIG. 9, the plunger connection member 250 interposes between the spindle connection member 248 and the compression screw 292. At the bottom 270, the plunger connection member 250 contacts the plunger 294. The force directing member 252 assumes the first position 288, which spaces the bottom of the force directing member 252 apart from the top of the compression screw 292.

FIG. 10 illustrates the loading pattern that the first configuration of the apparatus 200 creates to deform the spring member 218. During operation, actuation of the lift member 244 generates the load L onto the load measuring member 246, which transfers the load L to the plunger connection member 250. In one example, the load measuring member 246 rests on the plunger connection member 250. Contact between the bottom 270 of the plunger connection member 250 and the plunger 294 transfer the load L to cause the plunger 294 to press against the spring washer 298. The resulting loading on the spring washer 298 compresses the spring member 218 downwardly (in a first direction).

The load measurement member 246 provides a read out of the spring force that results from compression of the spring member 218. To set the set point of the pressure relief valve 284, one implementation of the apparatus 200 increases the load L until the spring force reaches a value calculated according to Equation (1) below:

$$F = P_{Set}\left(\frac{\pi}{4}\right)d_{Seat}^2, \quad\quad\quad \text{Equation (1)}$$

where F is the spring force, P.sub.Set is the set pressure (the "set point") of the pressure relief valve, and d.sub.Seat is the diameter of the seat on the nozzle member (e.g., nozzle member 124 of FIG. 1). Once the spring force F reaches the desired level, the compression screw 292 and the lock nut 296 can move (e.g., by hand or tool) to a position that engages the compression screw 292 against the plunger member 294 and the lock nut 296 against the bonnet member 226. This position of the compression screw 292 and the lock nut 296 locks the position of the compression screw 292, thus maintaining any deflection in the spring member 218 that results from the loading pattern discussed above.

FIGS. 11 and 12 illustrate the second configuration of the apparatus 200 that is useful to verify the set point of the pressure relief valve 284. In one implementation, a fastener B secures to the first end 256 of the spindle connection member 248 in lieu of use of the fasteners A on the mounting legs (e.g., mounting legs 234, 236 as shown in FIGS. 9 and 10). This construction allows the mounting plate 228 and the lift member 244 to move, or "float," relative to the bonnet member 226. The bottom 270 of the plunger connection member 250 is spaced apart from the plunger 294. The force directing member 252 assumes the second position 290, which locates the force directing member 252 in contact with the top of the compression screw 292.

FIG. 12 illustrates the loading pattern that the second configuration of the apparatus 200 creates to compress the spring member 218. During operation, actuation of the lift member 244 generates the load L onto the load measuring member 246, which transfers the load L to the plunger connection member 250. In one example, the load measuring member 246 rests on the plunger connection member 250. Unlike the first configuration, however, contact between the force directing member 252 (in the second position 290) and the compression screw 292 directs the load L to the bonnet member 226 (via connection between the compression screw 292 and the bonnet member 226) and not to the plunger 294. When the load L increases above the spring force of the spring member 218, the loading pattern of the second configuration causes the spring member 218 to compress in the second direction and, in turn, the lift member 244 (and mounting plate 228) translate on the mounting legs 234, 236 (and mounting leg 238, not shown) relative to the bonnet member 226. This movement indicates that the pressure relief valve 284 moves to the open position. The read out of the load measuring member 246 can be used to identify the spring force at which this movement occurs and, using Equation (1) above, equate the spring force to verify the set point of the pressure relief valve 284.

In light of the discussion above, embodiments of the apparatus 200 (and the apparatus 100) can function both to set and to verify the set point of the pressure relief valve 284 (and other valve assemblies). These capabilities are lacking in many, if not all, of the conventional devices that technicians can use to either set or verify set point, but not both.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A kit for changing compression of a spring member on a pressure relief valve, comprising:
   a spindle connection member comprising a shaft with an attachment element configured to secure to an end of a spindle on the pressure relief valve;
   a plunger connection member with a top, a bottom, and a first bore with a longitudinal axis and configured to fit onto the shaft of the spindle connection member, wherein the bottom of the plunger connection member is configured to interpose between the spindle and a compression screw disposed about the spindle on the pressure relief valve; and
   a force directing member with a central opening that is configured to receive the plunger connection member, wherein the force directing member is configured to transit the plunger connection member along the longitudinal axis between a first position and a second position, which is different from the first position and spaced part from the top of the plunger connection member.

2. The kit of claim 1, further comprising a mounting component with a mounting plate and a plurality of mounting legs having a first end that is configured to couple with a bonnet member of the pressure relief valve and a second end that is configured to penetrate through openings in the mounting plate.

3. The kit of claim 1, further comprising a lift member and a load measuring member, wherein the shaft of the spindle connection member is configured to fit into the lift member.

4. The kit of claim 3, wherein the lift member comprises a hydraulic lift that is configured to couple with the mounting plate.

5. The kit of claim 1, wherein the attachment element comprises threads that are configured to secure to corresponding threads on the spindle member of the pressure relief valve.

6. An apparatus that is configured to couple with a pressure relief valve having a bonnet member enclosing a spring assembly with a spindle member and a spring member, a disc element coupled to the spindle member, a nozzle element, a plunger having a position that is configured to compress the spring member, and a compression screw that is configured to affix the position of the plunger, said apparatus comprising:
   a first member comprising a shaft with an attachment element on a first end that is configured to secure to the spindle;
   a second member disposed annularly about the first member, the second member having a peripheral surface, a first bore that is configured to engage the shaft, and a second bore that is configured to receive the attachment element therein; and
   a third member disposed annularly about the second member, the third member having a central opening that is configured to engage the peripheral surface of the second member to allow the third member to transit between a first position and a second position on the second member,
   wherein the first position is configured to locate the third member in spaced relation to the compression screw and the second position is configure to locate the third member in contact with the compression screw.

7. The apparatus of claim 6, wherein the second member is sized and configured to interpose between the compression screw and the spindle member.

8. The apparatus of claim 6, further comprising a mounting plate and a plurality of mounting legs that are configured to locate the mounting plate in spaced relation to the bonnet member.

9. The apparatus of claim 8, wherein the mounting plate has a central opening that is configured to position a lift member to receive the shaft of the first member.

10. The apparatus of claim 9, wherein, in the first position, the third member is configured to direct a load from the lift member to cause the spring member to compress in a first direction that causes the disc element to contact the nozzle element.

* * * * *